United States Patent [19]

Hsu

[11] Patent Number: 4,874,181
[45] Date of Patent: Oct. 17, 1989

[54] COUPLING MEMBER FOR SECURING A DRILLING HEAD TO THE ROTATABLE ROD OF A PNEUMATIC TOOL BODY

[76] Inventor: Shing-Wang Hsu, No. 51-2, Lane 265, Tai Ping Rd., Tai Ping Hsiang, Taichung Hsien, Taiwan

[21] Appl. No.: 238,911

[22] Filed: Aug. 31, 1988

[30] Foreign Application Priority Data

May 31, 1988 [TW] Taiwan ............................... 77205185

[51] Int. Cl.4 ............................................. B23B 51/12
[52] U.S. Cl. ................................ 279/1 A; 408/239 A
[58] Field of Search ........................... 279/1 A, 1 ME; 408/239 A, 241 R, 239 R; 81/180.1, 181, 182, 185, 459; 173/29

[56] References Cited

U.S. PATENT DOCUMENTS 2,714,026  7/1955  Schultz .................................. 279/83
3,843,143 10/1974  Laxson ............................... 279/14 X
4,224,969  9/1980  Plessner ......................... 279/1 A X Primary Examiner—Steven C. Bishop
Attorney, Agent, or Firm—Marshall & Melhorn

[57] ABSTRACT

A coupling member includes a rectangular socket disposed at one end thereof and engaged snugly with the rectangular end of the rotatable rod of a pneumatic tool body, an externally threaded portion disposed at the other end of the coupling member and engaged with the large threaded hole of a drilling head, and a small threaded hole formed in the end surface of the externally threaded portion. When a bolt is passed through the fastener hole of the drilling head to engage with the small threaded hole of the coupling member, the drilling head is secured to the pneumatic tool body. When the assembly of the drilling head and the coupling member is removed from the pneumatic tool body, the rectangular socket of a rotating head can be engaged with the rectangular end of the rotatable rod of the pneumatic tool body, thereby forming a pneumatic wrench.

1 Claim, 3 Drawing Sheets

COUPLING MEMBER FOR SECURING A DRILLING HEAD TO THE ROTATABLE ROD OF A PNEUMATIC TOOL BODY

BACKGROUND OF THE INVENTION

This invention relates to an accessory of a pneumatic tool whereby the pneumatic tool can be used as either a drilling pneumatic tool or a nut-rotating pneumatic tool, more particularly to a coupling member which can secure a common drilling head to a common pneumatic tool body.

Referring to FIG. 1, an available nut-rotating pneumatic tool or pneumatic socket wrench 1 includes a tool body 10 on which a rotatable rod 11 is mounted. The rotatable rod 11 has an end portion of a rectangular cross-section on which a spring-biased ball 13 is provided. A rotating head 12 has a rectangular socket which is engaged snugly with the rotatable rod 11 of the tool body 10. It is easy to remove the rotating head 12 from the tool body 10.

An electric drill commonly includes an available drilling head shown in FIG. 4, and a body to which the drilling head is fastened. When rapid drilling of a hole and rapid rotation of a nut are desired, an electric drill and a nut-rotating pneumatic tool must be prepared beforehand. The carrying of both of these individual tools creates quite an inconvenience for the user.

SUMMARY OF THE INVENTION

It is therefore the main object of this invention to provide a coupling member for securing a common drilling head to the rotatable rod of a common nut-rotating pneumatic tool body from which a rotating head is removed, whereby, either the rotating head or the drilling head can be secured to the pneumatic tool body.

According to this invention, a coupling member is provided for securing a drilling head to the rotatable rod of a pneumatic tool body. The rotatable rod has a coupling end of a rectangular cross-section. The drilling head has a coupling end surface, a large threaded hole formed in the coupling end surface, and a fastener hole formed in the drilling head and communicated coaxially with the large threaded hole. The fastener hole is of a diameter smaller than that of the large threaded hole. The coupling member includes a rectangular socket disposed at one end thereof and engaged snugly with the coupling end of the rotatable rod of the pneumatic tool body, an externally threaded portion disposed at the other end of the coupling member and engaged with the large threaded hole of the drilling head, and a small threaded hole formed in the end surface of the externally threaded portion. When a bolt is passed through the fastener hole of the drilling head to engage with the small threaded hole of the coupling member, the drilling head is secured to the pneumatic tool body.

BRIEF DESCRIPTION OF THE DRAWINGS

Other features and advantages of this invention will become apparent in the following detailed description of a preferred embodiment of this invention with reference to the accompanying drawings in which.

DETAILED DESCRIPTION OF THE PREFERRED EMBODIMENT

Figure 1:
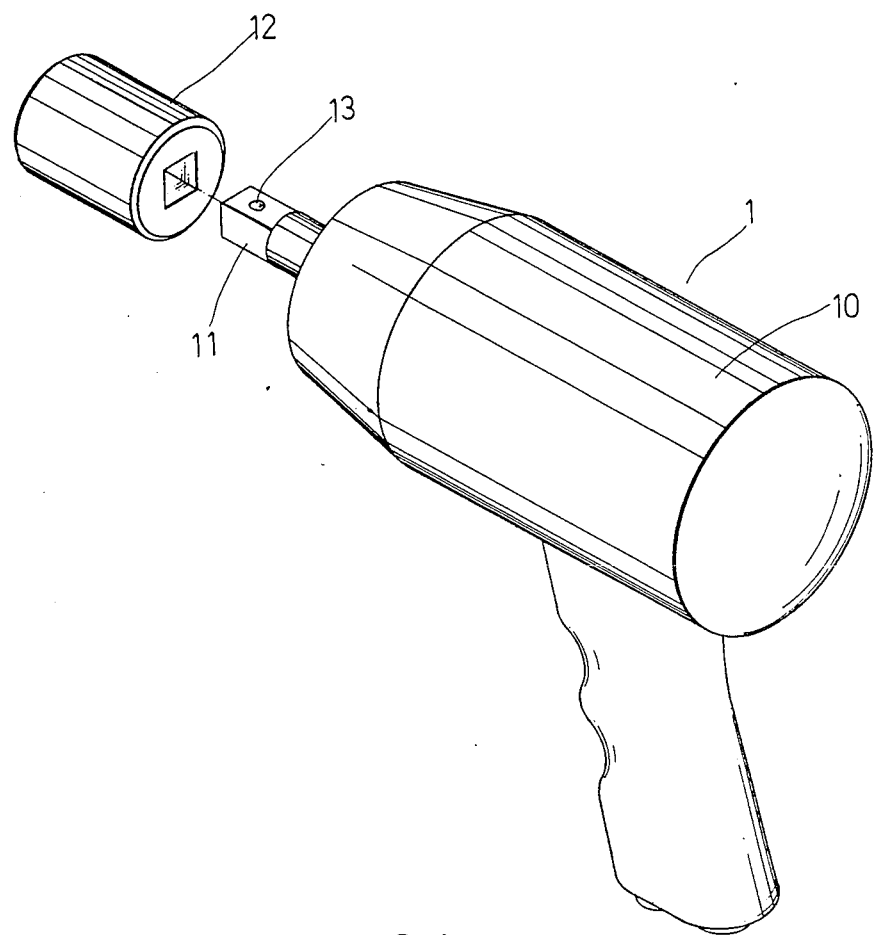
FIG. 1 is an exploded view of a conventional nut-rotating pneumatic tool.
Figure 2:
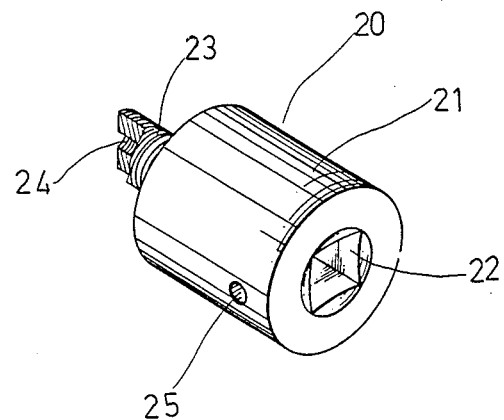
FIG. 2 is a partially sectional perspective view of a coupling member according to this invention.

Referring to FIG. 2, a metal coupling member 20 of this invention has a cylindrical main body 21 which includes a rectangular socket 22 at one end thereof. An externally threaded portion 23 projects from the other end surface of the main body 21 and has a small threaded hole 24 formed in the end surface thereof. A circular hole 25 is formed in the side surface of the main body 21 and communicated with the inside of the socket 22. The socket 22 is of a size that allows snug engagement with the rotatable rod 11 of the above-mentioned available pneumatic tool body 10, shown in FIG. 1. When the socket 22 is engaged with the rotatable rod 11, the ball 13 of the rotatable rod 11 is biased by spring action to engage with the circular hole 25 so that the coupling member 20 can be retained on the pneumatic tool body 10.

Figure 4:
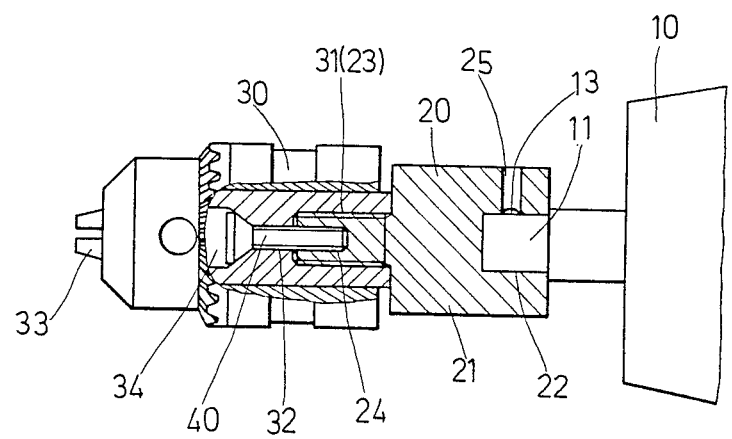
FIGS. 3 and 4 are schematic views illustrating the use of the coupling member according to this invention.
Figure 3:
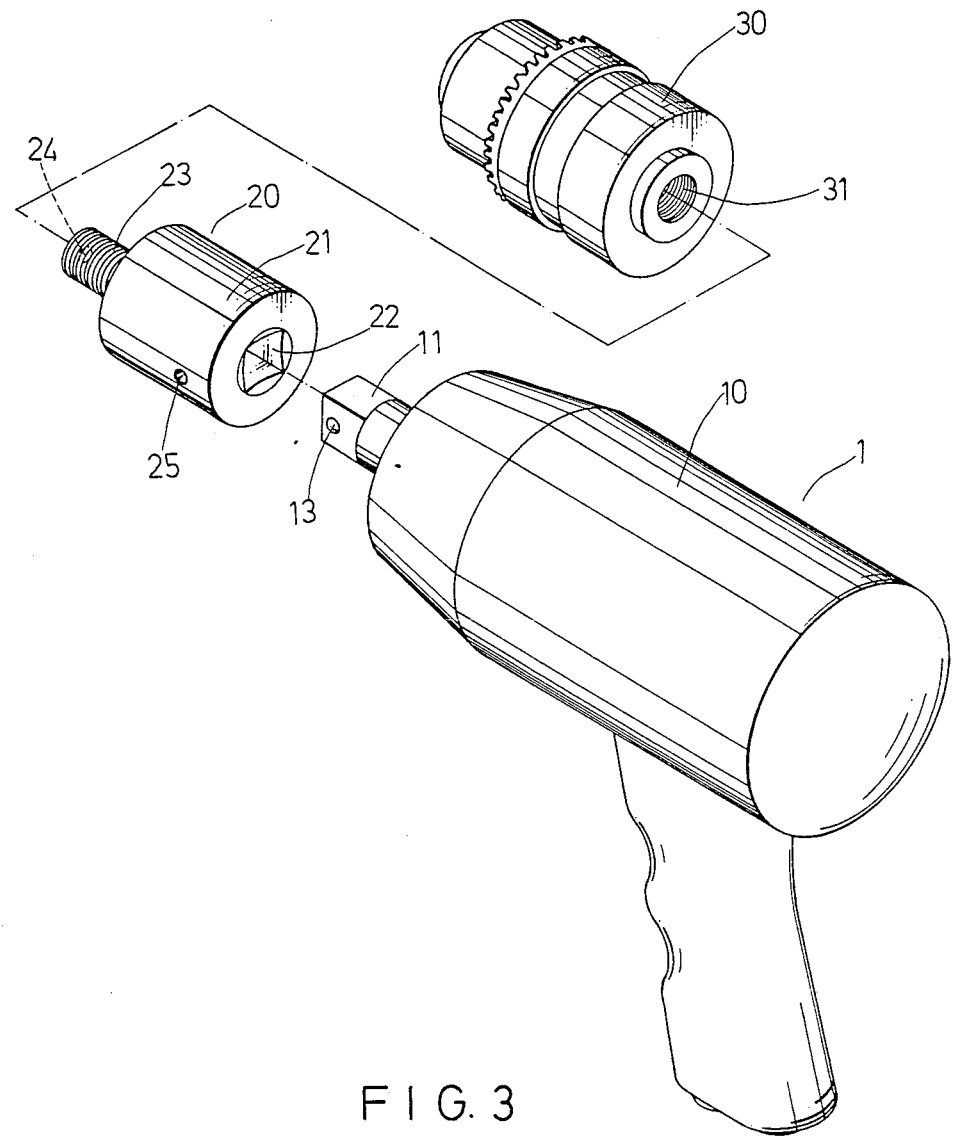

Referring to FIGS. 3 and 4, an available drilling head 30 includes a large threaded hole 31 formed in the coupling end surface thereof, a fastener hole or counterbore 32 formed in the drilling head 30 and communicated coaxially with the large threaded hole 31, and a chuck consisting of three adjustable jaws 33. In use, the externally threaded portion 23 of the coupling member 20 is engaged snugly with the large threaded hole 31 of the drilling head 30. A set bolt 40 is passed through the counterbore 32 to engage with the small threaded hole 24 of the coupling member 20 in such a manner that the head of the bolt 40 is received within the enlarged portion 34 of the counterbore 32. Then, the rotatable rod 11 of the pneumatic tool body 10 is inserted into the socket 22 of the coupling member 20 until the spring-biased ball 13 engages with the circular hole 25 of the coupling member 20. The assembly of the drilling head 30 and the coupling member 20 is therefore secured to the rotatable rod 11 of the pneumatic tool body 10 and can be rotated with the same.

When the pneumatic tool is prepared for the rotation of a nut, the assembly of the drilling head 30 and the coupling member 20 is pulled away from the pneumatic tool body 10. Then, again referring to FIG. 1, the socket of the above-mentioned available nut-rotating head 12 is engaged with the rotatable rod 11 of the pneumatic tool body 10, thereby forming a pneumatic socket wrench.

With this invention thus explained, it is apparent that numerous modifications and variations can be made without departing from the scope and spirit of this invention. It is therefore intended that this invention be limited only as indicated in the appended claims.

I claim:

1. A coupling member for releasably securing a drilling head (30) to the rotatable rod (11) of a pneumatic tool body (10), said rotatable rod (11) including a coupling end portion of rectangular cross-section, said drilling head (30) comprising a generally cylindrical body having a coupling end surface, a first threaded hole (31) formed axially in said cylindrical body and extending inwardly from said coupling end surface, a second fastener hole (32) of smaller diameter than said first hole formed in said cylindrical body, said fastener hole extending axially inwardly from the end of said cylindrical body opposite said coupling end surface and communicating with said first threaded hole (31), said fastener hole (32) having an enlarged counter bore portion (34) including an outwardly flaring surface at the end of said fastener hole (32) opposite said first threaded hole (31), said coupling member (20) comprising a generally cylindrical main body (21) having a rectangular socket (22) extending axially inwardly at one of its ends for snugly receiving said coupling end portion of said rotatable rod (11), an externally threaded extension (23) projecting from the other end of said coupling member (20) for mating reception in said first threaded hole of said drilling head (30), a threaded hole (24) extending axially into said extension (23) from the free end thereof, and a bolt (40) extending through said second fastener hole (32) of said drilling head (30) and threaded into said threaded hole (24) of said coupling member (20), said bolt (40) including a head whose undersurface tapers to matingly engage said outwardly flaring surface at the end of said fastener hole (32) whereby said drilling head (30) is secured to said coupling member (20) in rigid axial alignment therewith.

* * * * *